(12) United States Patent
Bier

(10) Patent No.: US 10,598,206 B2
(45) Date of Patent: Mar. 24, 2020

(54) SHEAR BOLT WITH SAFETY FEATURE

(71) Applicant: Richards Manufacturing Company, a New Jersey Limited Partnership, Irvington, NJ (US)

(72) Inventor: Bruce Bier, Warren, NJ (US)

(73) Assignee: Richards Manufacturing Company, a New Jersey Limited Partnership, Irvington, NJ (US)

( * ) Notice: Subject to any disclaimer, the term of this patent is extended or adjusted under 35 U.S.C. 154(b) by 53 days.

(21) Appl. No.: 16/017,679

(22) Filed: Jun. 25, 2018

(65) Prior Publication Data

US 2018/0306231 A1    Oct. 25, 2018

Related U.S. Application Data

(63) Continuation-in-part of application No. 15/444,627, filed on Feb. 28, 2017, now Pat. No. 10,006,480.

(60) Provisional application No. 62/314,125, filed on Mar. 28, 2016.

(51) Int. Cl.
 *F16B 31/02* (2006.01)
(52) U.S. Cl.
 CPC ............................. *F16B 31/021* (2013.01)
(58) Field of Classification Search
 CPC .................................................. F16B 31/021

USPC ....................................................... 411/2, 3, 5
See application file for complete search history.

(56) References Cited

U.S. PATENT DOCUMENTS

| 1,018,741 | A | | 2/1912 | Davis | |
|---|---|---|---|---|---|
| 3,191,486 | A | * | 6/1965 | Gibbens | B25B 23/1415 411/4 |
| 3,929,054 | A | | 12/1975 | Gutshall | |
| 4,720,204 | A | | 1/1988 | Johnson | |
| 5,256,015 | A | | 10/1993 | St. Clair | |
| 8,136,766 | B2 | | 3/2012 | Dennis | |
| 10,347,999 | B2 | * | 7/2019 | Vanzetto | F16B 31/021 |
| 2009/0191019 | A1 | | 7/2009 | Billings | |
| 2018/0258975 | A1 | * | 9/2018 | Polidori | F16B 37/145 |

* cited by examiner

*Primary Examiner* — Flemming Saether
(74) *Attorney, Agent, or Firm* — Stroock & Stroock & Lavan LLP

(57) ABSTRACT

A safety shear bolt includes a main bolt portion and a torque head portion connected to the main bolt portion. The torque head portion includes an extended head portion, a stem portion rigidly connecting the main bolt portion to the torque head portion, and a coupling mechanism rotatably connecting the extended head portion to the main bolt portion. The stem portion is configured to shear when a predetermined torque is applied to the extended head portion, while the coupling mechanism prevents the extended head portion from dropping after shearing off from the main bolt portion.

4 Claims, 20 Drawing Sheets

Fig. 1, Prior Art

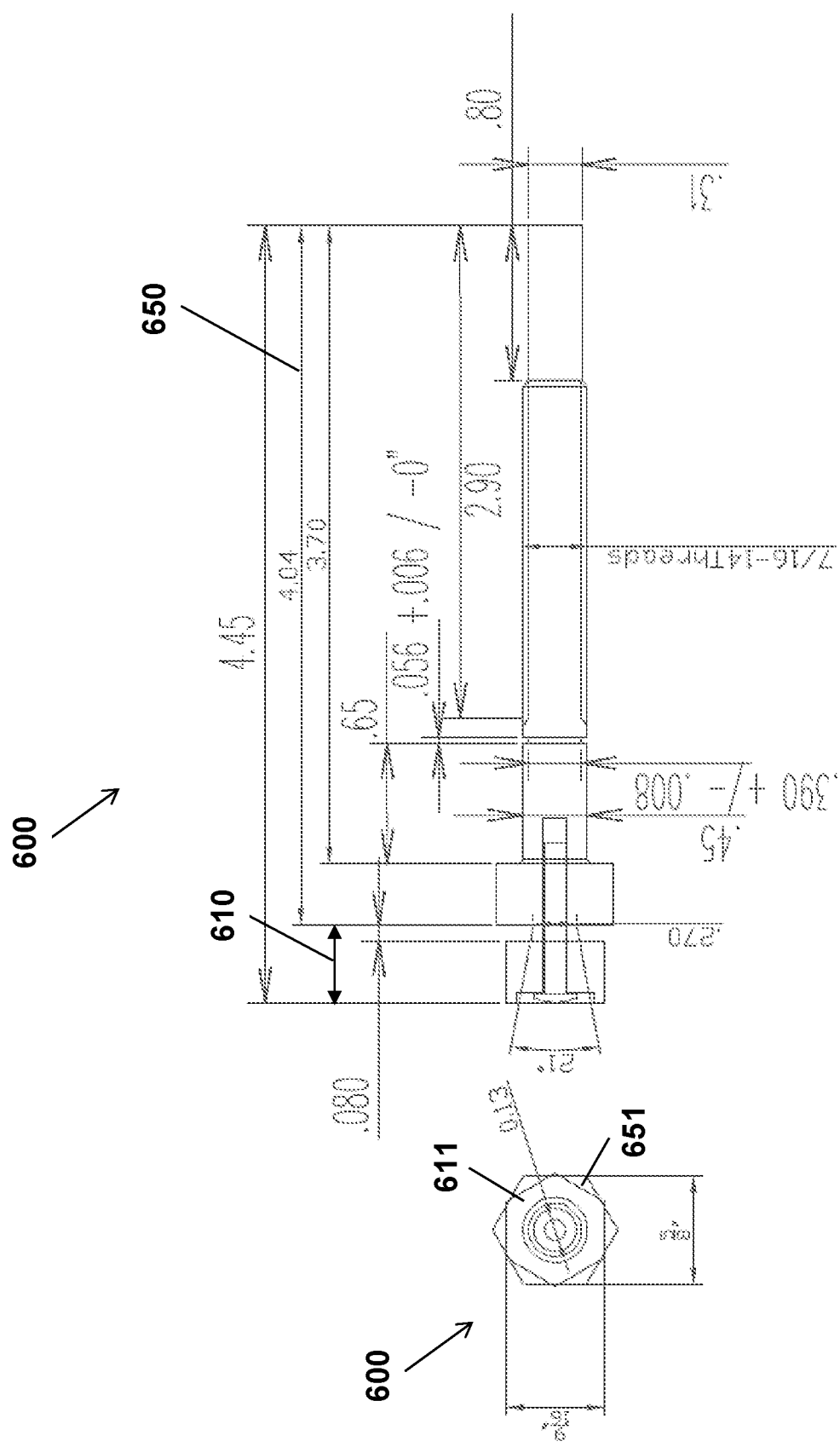

SHEAR BOLT WITH SAFETY FEATURE

CROSS-REFERENCE TO RELATED APPLICATIONS

This application is a continuation-in-part of U.S. application Ser. No. 15/444,627, filed Feb. 28, 2017, now U.S. Pat. No. 10,006,480, which claims the benefit of, and priority to, U.S. Provisional Application No. 62/314,125, filed Mar. 28, 2016, both of which are incorporated by reference herein in their entirety.

BACKGROUND OF THE INVENTION

1. Field of the Invention

The present invention generally relates to connectors. In particular, various embodiments of the present invention concern a shear bolt with a safety feature to prevent accidental dropping of the sheared bolt head.

2. Description of the Related Art

Various situations arise in which the use of a shear bolt is desirable to ensure that a bolted connection is torqued to the proper value. A shear bolt comprises an extended torque head portion that is designed and constructed to shear off the main body of the bolt at a predetermined torque. Such bolts are described, for example, in U.S. Pat. No. 6,884,124 to Douglas Craig, entitled "Obstruction Assembly for Use with Disconnectable Joints and Methods of Using the Same," the contents of which are incorporated herein by reference.

As illustrated in FIG. 1, a conventional shear bolt 100 comprises a torque head portion 110, which protrudes from a main bolt portion 150 by a predetermined distance. Main bolt portion 150 has the appearance of a standard bolt and includes a head portion 151 with a threaded, or partially threaded, shaft portion 152. The head portion 151 and shaft portion 152 are generally designed to have dimensions similar to those required of the standard (i.e., non-shear) bolt for the same application. Hence, while main bolt portion 150 may have the same length as the standard bolt for the application, shear bolt 100 may have an overall longer length than such standard bolt. The shear bolt 100 is preferably formed as a single, integrated piece, although it is also possible to join torque head portion 110 and main bolt portion 150 together as respective separate pieces to form the integrated shear bolt 100.

Torque head portion 110 of shear bolt 100 typically includes an extended head portion 111 and a stem portion 112. Extended head portion 111 and stem portion 112 are generally formed as a single integrated piece, although they could also be formed as separate pieces that are rejoined together. Stem portion 112 extends from surface 153 of head portion 151 of main bolt portion 150 to the underside of extended head portion 111. Stem portion 112 is designed such that the extended head portion 111 of shear bolt 100 will break off from the main bolt portion 150 when a pre-determined amount of torque is applied to the extended head portion 111. A shear location 113 of stem portion 112 may be at any desired location, such that stem portion 112 may remain fully attached to extended head portion 111, to main bolt portion 150, or partially attached to either or both, as a matter of application-specific design choice.

Stem portion 112 is typically constructed and designed to have a thinner width than the width of shaft portion 152 of main bolt portion 150, and is designed to shear off at shear location 113 at a pre-determined torque value, such as between approximately 50 to 60 foot-pounds of torque. Extended head portion 111 can comprise a hexagonal shape and the upper surface of extended head portion 111 can be flat, making it suitable for tightening or loosening using conventional tools. The width of extended head portion 111 can be greater, equal to, or smaller than the width of head portion 151.

Shear bolt 100 can be used in situations, for example, in which assurance is required that main bolt portion 150 has been tightened to the proper, pre-determined, torque. For example, the extended head portion 111, due to its excessive length, may prevent further steps in an installation process from being possible, such as the mounting of a sleeve over main bolt 150, until the extended head portion 111 has been removed, thus requiring that the extended head portion 111 be sheared off before the installation can be finished, and thus ensuring that main bolt 150 has been tightened to the proper torque value.

Shear bolt 100 may be used in situations in which extended head portion 111 may fall from some height when sheared off from head portion 151. For example, shear bolt 100 can be used by electric utilities to connect two cables together. Typically, the cables are overhead and affixed to insulators that are mounted onto utility poles. Use of shear bolt 100 ensures that the connection is torqued to its proper value. However, since extended head portion 111 is free after installation, it is possible for extended head portion 111 to fall from the mechanic's hand and damage property or injure individuals at ground level. This is especially true since mechanics may be required to wear heavy gloves during work on energized cables, thus making it difficult to hold onto components.

It is therefore desirable to provide a shear bolt that can avoid inadvertent dropping of the sheared bolt head during installation.

SUMMARY

In some embodiments, the invention provides a safety shear bolt comprising a main bolt portion comprising a first head portion and a shaft portion; a torque head portion rigidly connected to the main bolt portion, the torque head portion comprising a second head portion and a stem portion extending from a top surface of the first head portion of the main bolt portion to an underside surface of the second head portion, the stem portion configured to shear along a shear line when a predetermined amount of torque is applied to the second head portion; and a coupling mechanism releasably, rotatably connecting the second head portion to the main bolt portion after shearing of the stem portion, thereby preventing inadvertent dropping of the second head portion, the coupling mechanism allowing the second head portion to rotate with respect to the main bolt portion while preventing free longitudinal movement of the second head portion with respect to the main bolt portion.

In some embodiments, the second head portion has a longitudinal width smaller than that of the first head portion.

In some embodiments, the safety shear bolt further comprises a flange along the stem portion, the flange having a width larger than that of the second head portion.

In some embodiments, the coupling mechanism comprises: an opening longitudinally disposed through the second head portion, the stem portion and into at least a portion of the main bolt portion; and a fastening device releasably disposed in the opening and engaging with the main bolt portion.

In some embodiments, the fastening device is a blind rivet.

In some embodiments, the invention provides a safety shear bolt comprising a main bolt portion; a torque head portion rigidly connected to the main bolt portion and configured to rotationally detach from the main bolt portion when a pre-determined torque is applied to the torque head portion; and a coupling mechanism configured to keep the torque head portion releasably connected to the main bolt portion after the torque head portion rotationally detaches from the main bolt portion.

In some embodiments, the invention provides a shear bolt comprising: a main bolt portion; a torque head portion coupled to the main bolt portion, the torque head portion comprising: a head portion; and at least a stem portion disposed between the head portion and the main bolt portion, the stem portion connecting the main bolt portion to the torque head portion and configured to shear when a predetermined torque is applied to the head portion; and a coupling mechanism releasably, rotatably connecting the head portion to the main bolt portion.

In some embodiments, the coupling mechanism comprises: an opening longitudinally disposed through the head portion, the stem portion and into at least a portion of the main bolt portion; and a pin releasably disposed in the opening and engaging with the main bolt portion.

In some embodiments, the pin is a humpback cotter pin, a humpback of the humpback cotter pin frictionally engaging with the opening in the main bolt portion.

In some embodiments, the pin is an R-pin frictionally engaging with the opening in the main bolt portion.

In some embodiments, the pin is a spring pin frictionally engaging with the opening in the main bolt portion.

In some embodiments, the coupling mechanism comprises a split bushing with flanges that engage the main bolt portion and the torque head portion.

In some embodiments, the invention provides a shear bolt comprising: a main bolt portion comprising a first head portion and a shaft portion, a longitudinal opening extending from the first head portion to the shaft portion; a torque head portion comprising a second head portion and a stem portion, the stem portion disposed in the longitudinal opening; and a coupling mechanism connecting the stem portion to the main bolt portion and configured to shear under a predetermined torque applied to the second head portion to rotationally detach the torque head portion from the main bolt portion.

In some embodiments, the longitudinal opening includes a first slot, the stem portion comprises a second slot corresponding to the first slot, and the coupling mechanism comprises a key extending from the first slot to the second slot.

In some embodiments, the coupling mechanism comprises a headed pin disposed in a longitudinal opening that extends through the torque head portion and into at least a portion of the main bolt portion.

In some embodiments, the coupling mechanism further comprises a spring pin disposed through a radial opening extending through at least a portion of the main bolt portion and through at least a portion of the headed pin.

BRIEF DESCRIPTION OF THE DRAWINGS

The various aspects and embodiments disclosed herein will be better understood when read in conjunction with the appended drawings, wherein like reference numerals refer to like components. For the purposes of illustrating aspects of the present application, there are shown in the drawings certain preferred embodiments. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The drawings are not necessarily drawn to scale and are not in any way intended to limit the scope of this invention, but are merely presented to clarify illustrated embodiments of the invention. In these drawings:

FIG. 18A is a top view and FIG. 18B is a side view of a shear bolt with blind rivet in another exemplary size, with dimensions indicated in inches;

DETAILED DESCRIPTION OF THE PREFERRED EMBODIMENTS

Various embodiments use a coupling mechanism to releasably secure the sheared extended head portion to the main bolt after installation, thereby preventing extended head portion from falling. The sheared extended head portion can still be removed by pulling with force to cause the coupling mechanism to release the extended head portion from the main bolt.

Figure 1:
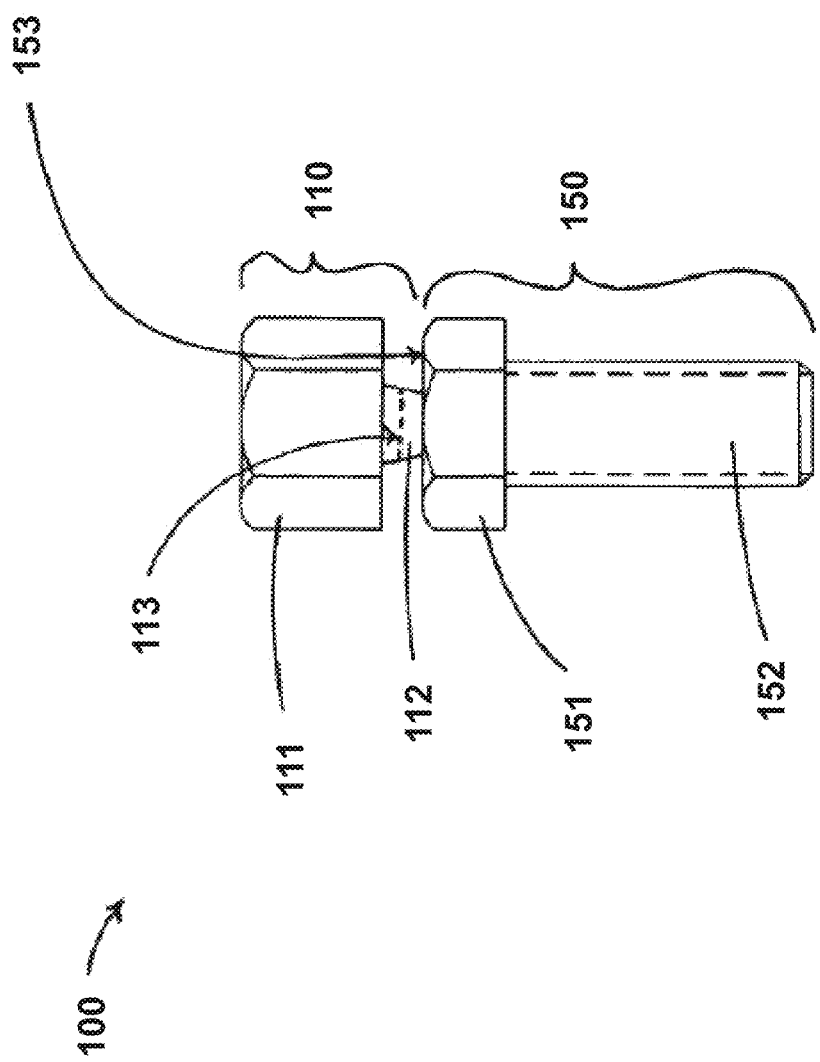
FIG. 1 illustrates a conventional shear bolt.
Figure 2:
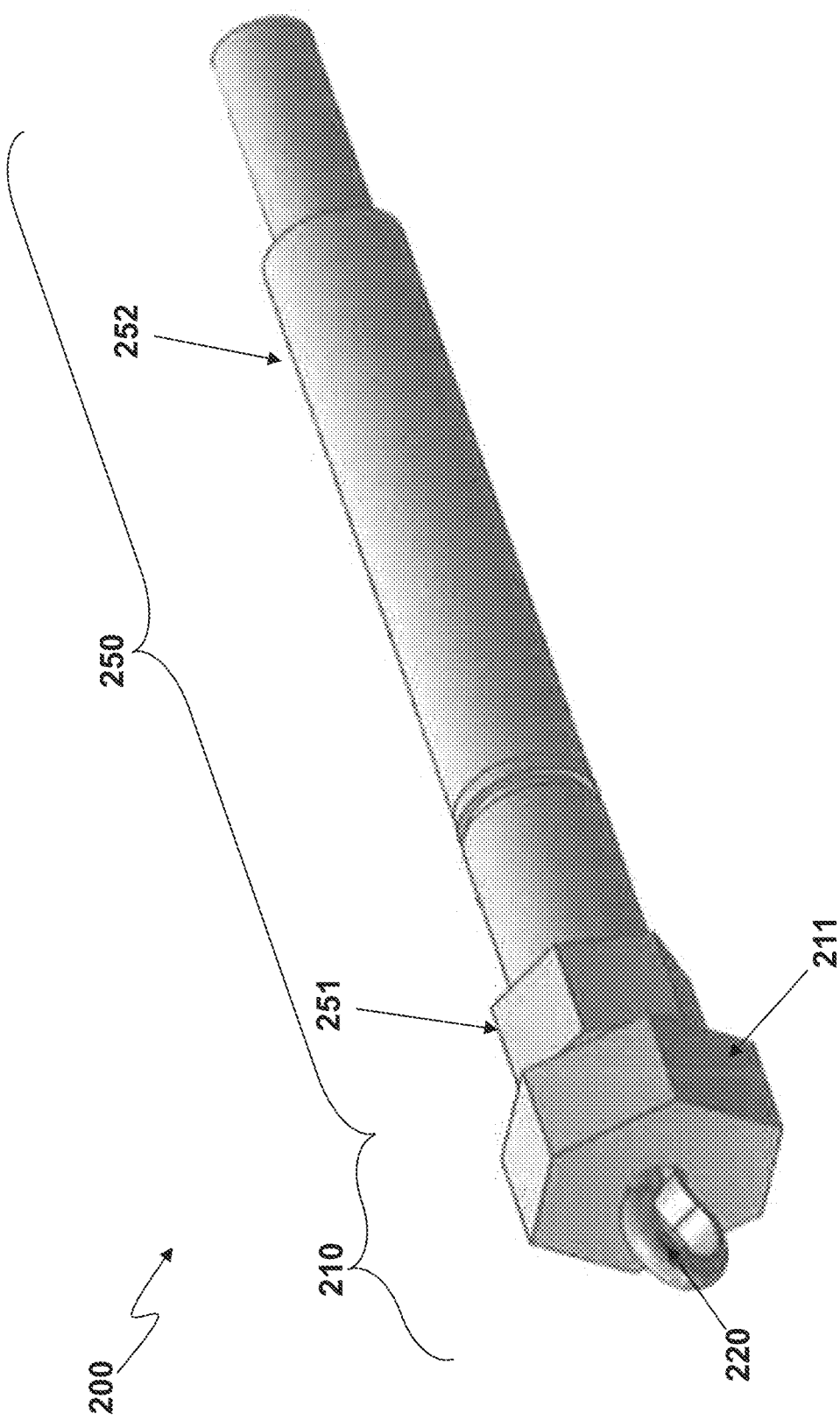
FIG. 2 is a perspective view of an embodiment shear bolt.
Figure 3:
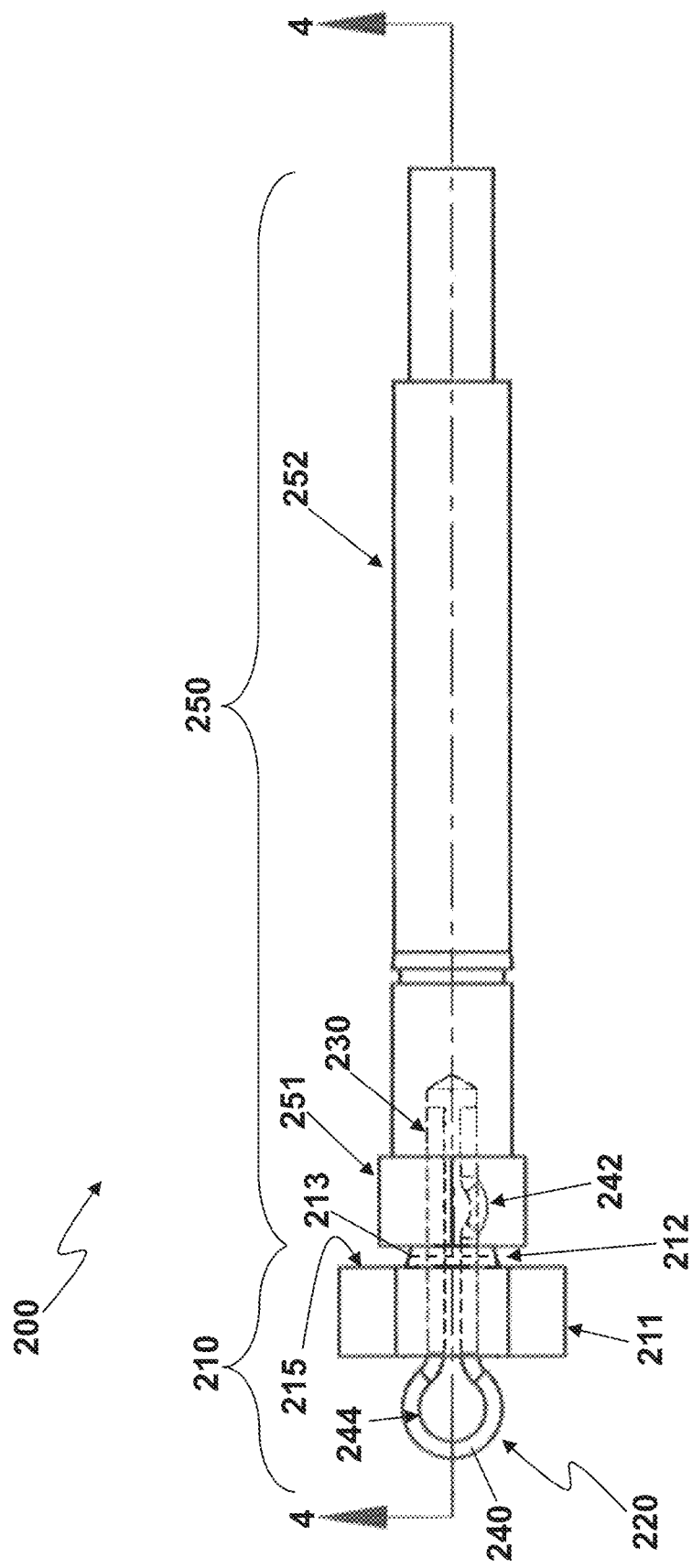
FIG. 3 is a side view of the embodiment shear bolt depicted in FIG. 2.
Figure 4:
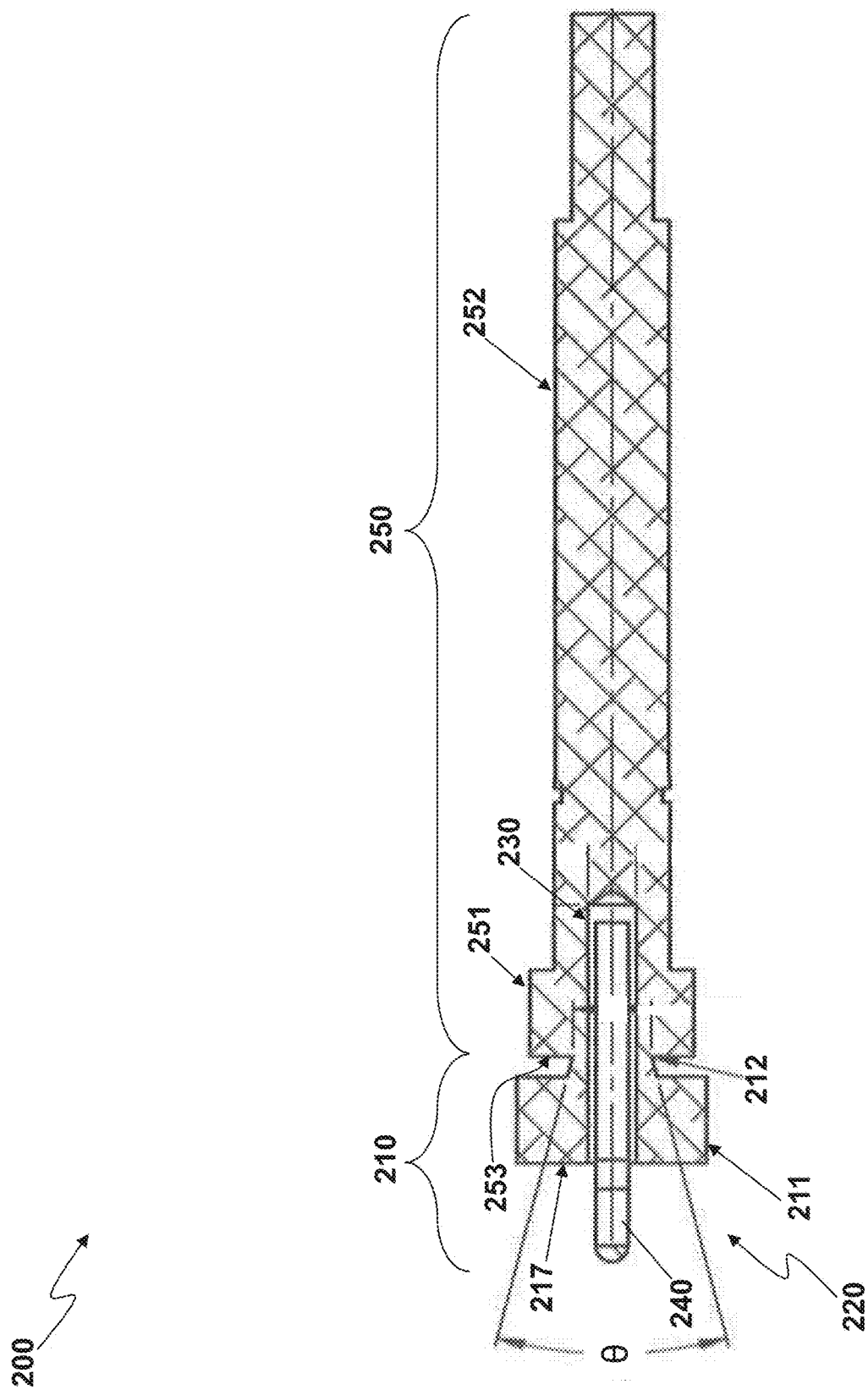
FIG. 4 is a cross-sectional view along line 4-4 shown in FIG. 3.

An embodiment safety shear bolt 200 is depicted in FIGS. 2-4. The safety shear bolt 200 comprises a torque head portion 210, which protrudes from a main bolt portion 250 by a predetermined distance. Main bolt portion 250 can have the appearance (i.e., length, diameter, threading, head size, etc.) of a standard bolt suitable for the intended application and includes a head portion 251 with a threaded, or partially threaded, shaft 252. The head portion 251 and shaft portion 252 are preferably designed to have dimensions similar, or functionally identical, to those required of the standard bolt for the same application. Safety shear bolt 200 is preferably formed as a single, integrated piece. In alternative embodiments, however, safety shear bolt 200 is formed in separate pieces such that torque head portion 210 and main bolt portion 250, as respective separate pieces, are coupled together to form the integrated safety shear bolt 200.

Torque head portion 210 includes an extended head portion 211, a stem portion 212 and a coupling mechanism 220. Extended head portion 211 and stem portion 212 are formed as a single, integrated piece. In other embodiments, extended head portion 211 and stem portion 212 are formed as separate pieces that are joined together. Coupling mechanism 220 is a separate piece that is used to connect extended head portion 211 to main bolt portion 250 after stem portion 212 has sheared along a shear line 213.

Stem portion 212 extends from top surface 253 of head portion 251 of main bolt portion 250 to the underside surface 215 of extended head portion 211 and rigidly connects main bolt portion 250 to extended head portion 211. Although a single stem portion 212 is shown, in other embodiments multiple stem portions may be employed. Stem portion 212 is designed such that extended head portion 211 breaks or shears off, along shear line 213, from main bolt portion 250 when a pre-determined amount of torque is applied to extended head portion 211, thus rotationally detaching extended head portion 211 from main bolt portion 250—i.e., extended head portion 211 is then free to rotate relative to main bolt portion 250. Shear location 213 of stem portion 212 may be at any desired location, such that stem portion 212 may remain fully attached to extended head portion 211, to main bolt portion 250, or have portions attached to either or both, as a matter of application-specific design choice. Stem portion 212 may have any suitable shape, materials or both to achieve the desired shearing along shear line 213 when the pre-determined amount of torque is reached. For example, stem portion 212 may be made from the same metal as main bolt portion 250 and conically shaped, with an opening angle θ of approximately 30°. In the embodiment safety shear bolt 200, stem portion 212 has a thinner width than the width of shaft portion 252 of main bolt portion 250. In other embodiments, stem portion is made from a metal or material that is different from that used to make main bolt portion 250.

Extended head portion 211 comprises a hexagonal shape, and the upper surface 217 of extended head portion 211 can be flat, making it suitable for tightening or loosening using conventional tools. The longitudinal width of extended head portion 211 can be greater than, equal to, or smaller than the corresponding width of head portion 251. Similarly, the radial height of extended head portion 211 can be greater than, equal to, or smaller than the corresponding height of head portion 251. Extended head portion 211 may also have shapes other than hexagonal, such as square or the like.

Coupling mechanism 220 is any suitable device, configuration or both that can releasably connect extended head portion 211 to main bolt portion 250 after shearing of stem portion 212, thereby preventing inadvertent dropping of extended head portion 211. Hence, coupling mechanism 220 preferably allows rotational detachment of extended head portion 211 from main bolt portion 250, i.e., allowing extended head portion 211 to rotate with respect to main bolt portion 250, while ensuring a continued physical connection of extended head portion 211 to main bolt portion 250, such as by preventing free longitudinal movement of extended head portion 211 with respect to main bolt portion 250. That is, coupling mechanism 220 preferably rotationally connects extended head portion 211 to main bolt portion 250 in a longitudinally releasable manner. In the embodiment safety shear bolt 200, coupling mechanism 220 comprises a fastening device in the form of a humpback cotter pin 240, which is disposed within an opening 230 that extends through extended head portion 211, stem portion 212 and into main bolt portion 250, such that humpback 242 of cotter pin 240 is disposed within and frictionally engages with main bolt portion 250. Frictional engagement of humpback 242 keeps cotter pin 240 connected to main bolt portion 250, while eyelet 244 of cotter pin 240, which is sized greater than the diameter of opening 230 through extended head portion 211, prevents extended head portion 211 from coming off of cotter pin 240, thus releasably securing extended head portion 211 to main bolt portion 250. Extended head portion 211 can still rotate freely with respect to head portion 251 of main bolt portion 250, such as around cotter pin 240, but remains physically connected to main bolt portion 250. However, with an adequate pulling force exerted upon extended head portion 211, cotter pin 240 can be released from opening 230 in main bolt portion 250, thus physically detaching extended head portion 211 from main bolt portion 250, but only if stem portion 212 has already sheared.

It will be appreciated that other types of coupling mechanisms are possible. For example, an R-pin, spring pin or any other suitable device could be used for the fastening device. The fastening device may protrude from opening 230, as shown in FIGS. 2-4, or may be entirely disposed in opening 230.

Figure 5:
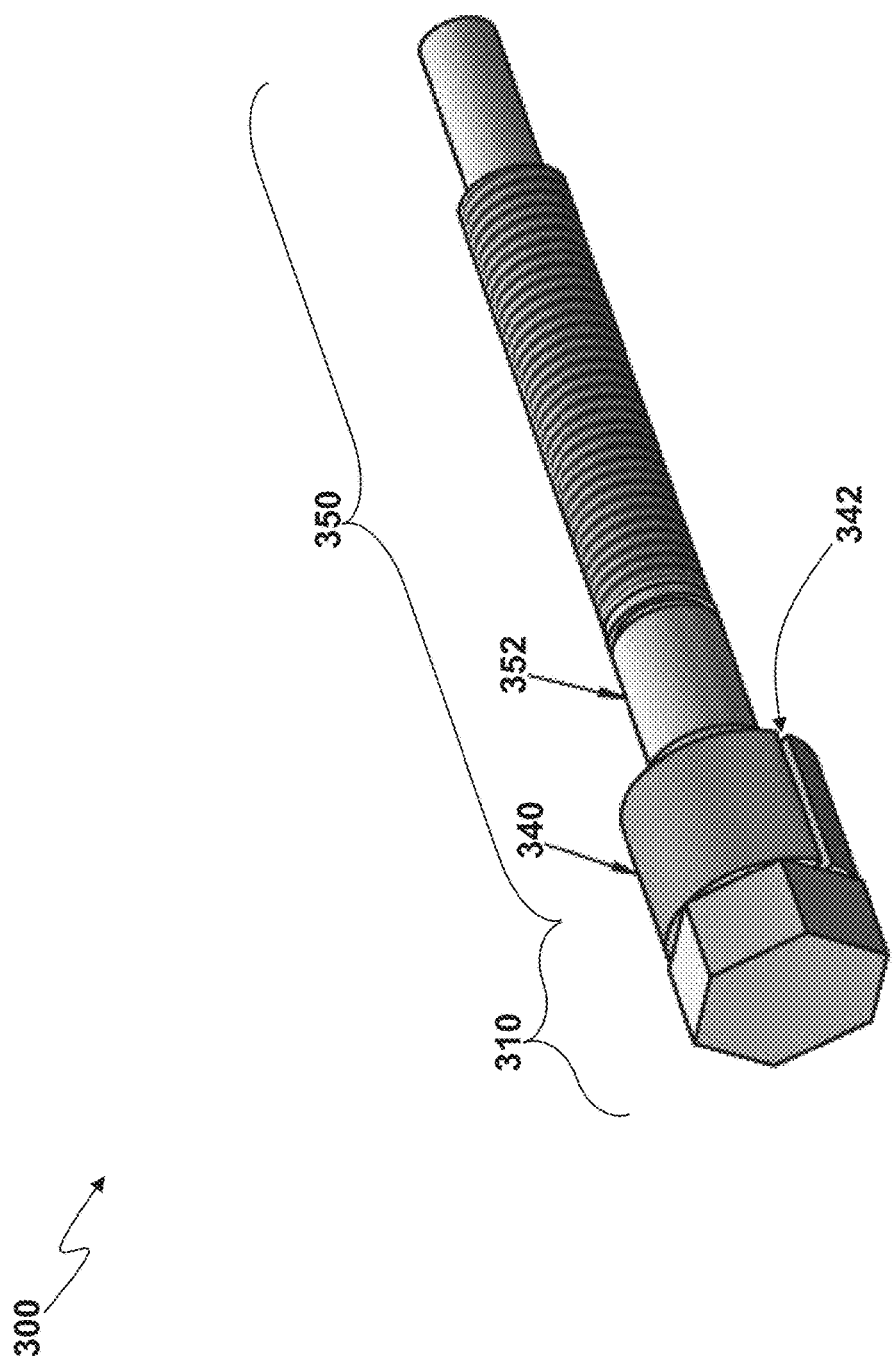
FIG. 5 is a perspective view of another embodiment shear bolt.
Figure 6:
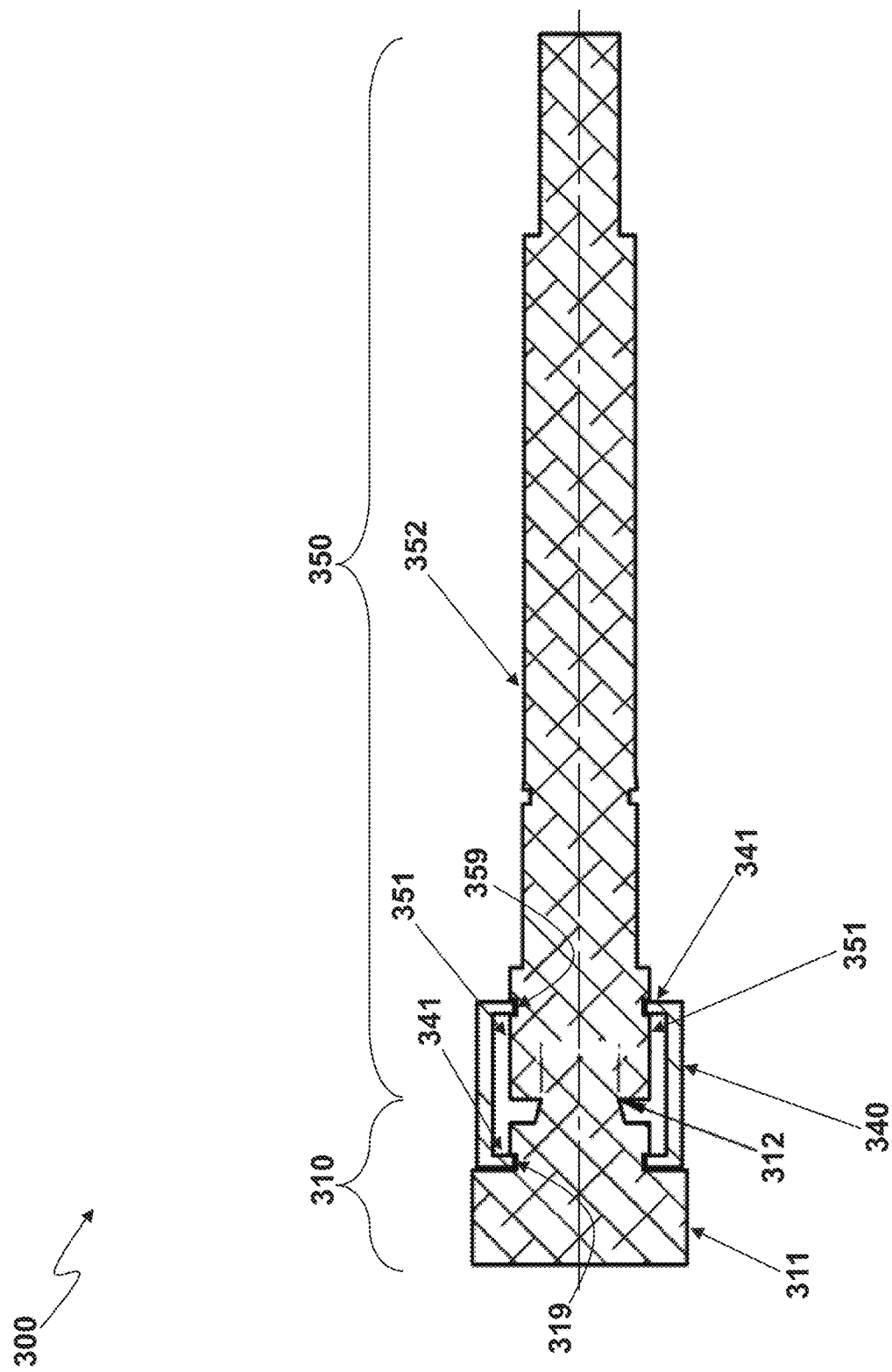
FIG. 6 is a longitudinal cross-sectional view of the embodiment shear bolt depicted in FIG. 5.
Figure 7:
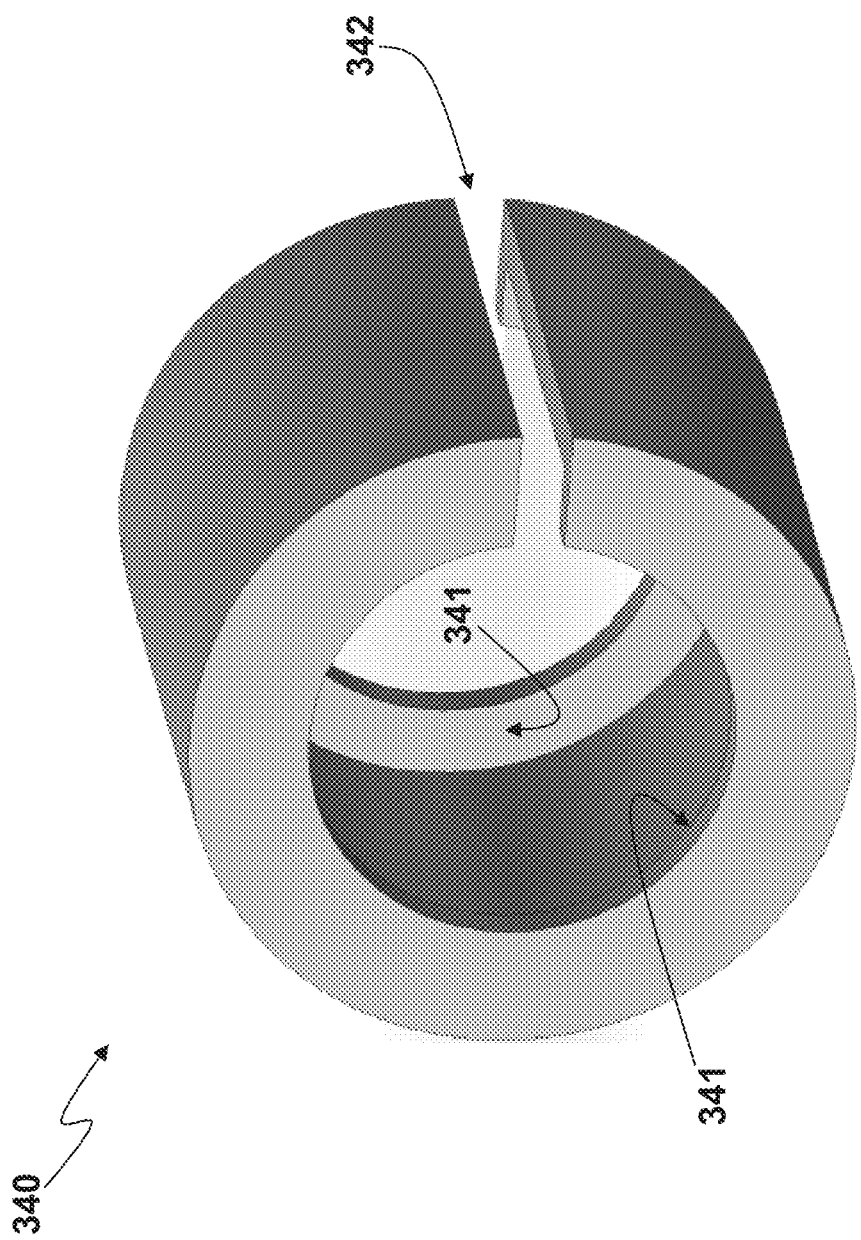
FIG. 7 is a perspective view of a coupling mechanism for the embodiment shear bolt depicted in FIG. 5.

By way of example, FIGS. 5-7 depict another embodiment safety shear bolt 300. Similar to shear bolt 200 discussed above, shear bolt 300 comprises a torque head portion 310, which protrudes from a main bolt portion 350 by a predetermined distance. Main bolt portion 350 can have the appearance of a standard bolt suitable for the intended application and includes a head portion 351 with a threaded, or partially threaded, shaft portion 352. Torque head portion 310 includes an extended head portion 311, a stem portion 312 and a coupling mechanism 340. Coupling mechanism 340 is a separate piece that is used to connect extended head portion 311 to main bolt portion 350 after stem portion 312 has sheared along the shear line. Coupling mechanism 340 thus extends across, and physically couples together, torque head portion 310 and main bolt portion 350. As indicated in FIGS. 5 and 6, because head portion 351 is covered, wholly or partly, by coupling mechanism 340, the width of extended head portion 311 may be greater than the width of head portion 351, although it will be appreciated that this is not required.

Coupling mechanism 340 can be, for example, a split bushing, having a substantially C-shaped cross-section perpendicular to its axial (longitudinal) axis, and a gap 342 extending along the entirety of the longitudinal length of coupling mechanism 340. Gap 342 allows coupling mechanism to expand, and thus release, from main bolt portion 350, and thus release extended head portion 311 from head portion 351. Opposing ends of coupling mechanism 340 respectively terminate in flanges 341. Flanges 341 respectively engage a corresponding notch 319 in extended head portion 311 and a corresponding notch 359 in main bolt portion 350, each of which respectively encircles extended head portion 311 and main bolt portion 350. Due to the sliding arrangement of flanges 341 with notches 319, 359, coupling mechanism 340 is able to rotate freely while keeping extended head portion 311 physically connected to main bolt portion 350. Further, as coupling mechanism 340 completely or partially covers head portion 351, a user cannot use head portion 351 to tighten main bolt portion 350 but instead must use extended head portion 311. However, once extended head portion 311 shears from main bolt portion 350, sufficient pulling or torqueing on coupling mechanism 340 will, because of gap 342, cause coupling mechanism 340 to expand sufficiently to free flange 341 from its corresponding notch 359 in main bolt portion 350, and thus both coupling mechanism 340 and sheared extended head portion 311 can be removed from main bolt portion 350. Thereafter, as head portion 351 is then exposed, conventional tools sized to head portion 351 can be used to further tighten or release main bolt portion 350.

Figure 8:
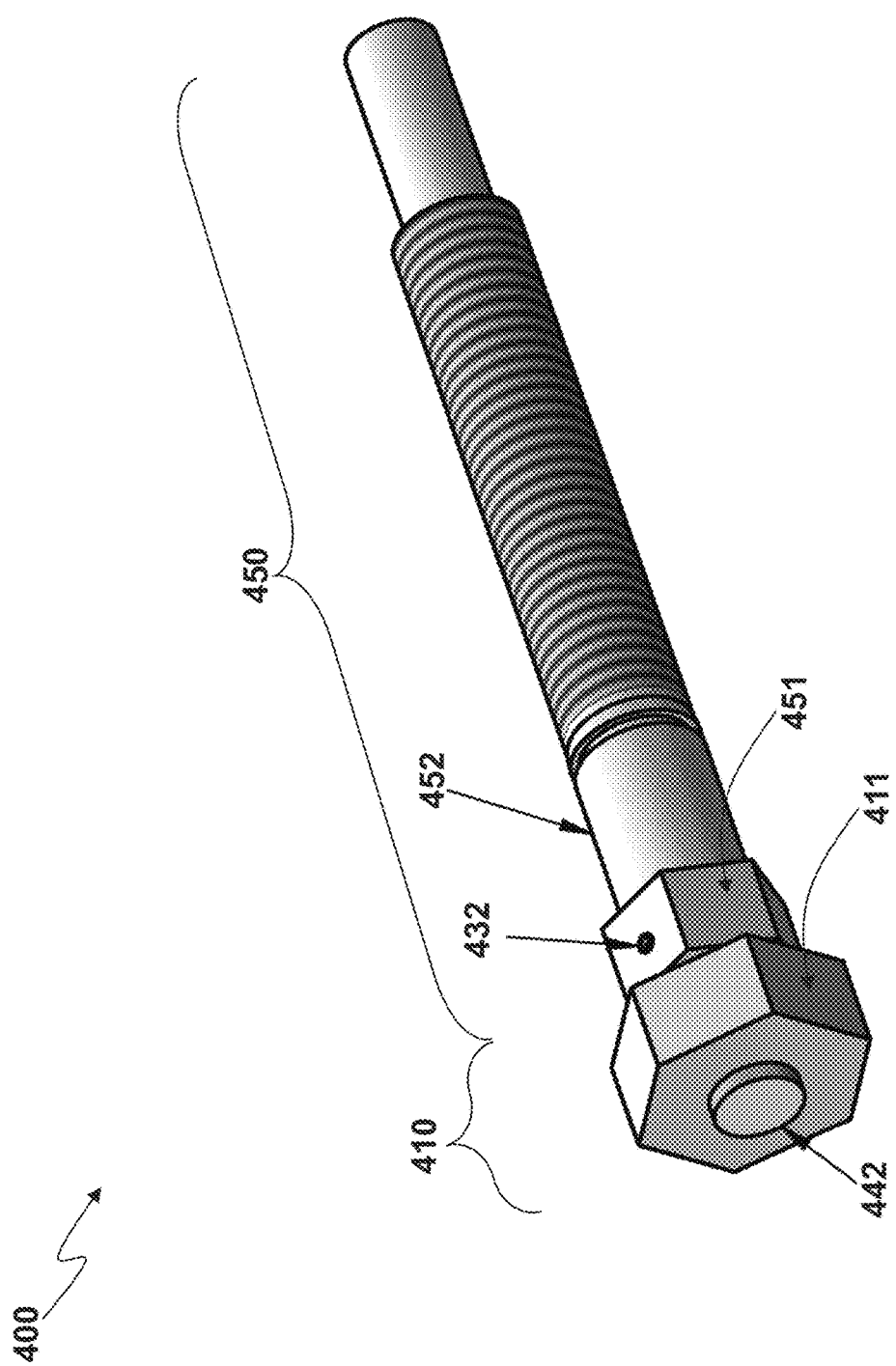
FIG. 8 is a perspective view of another embodiment shear bolt.
Figure 9:
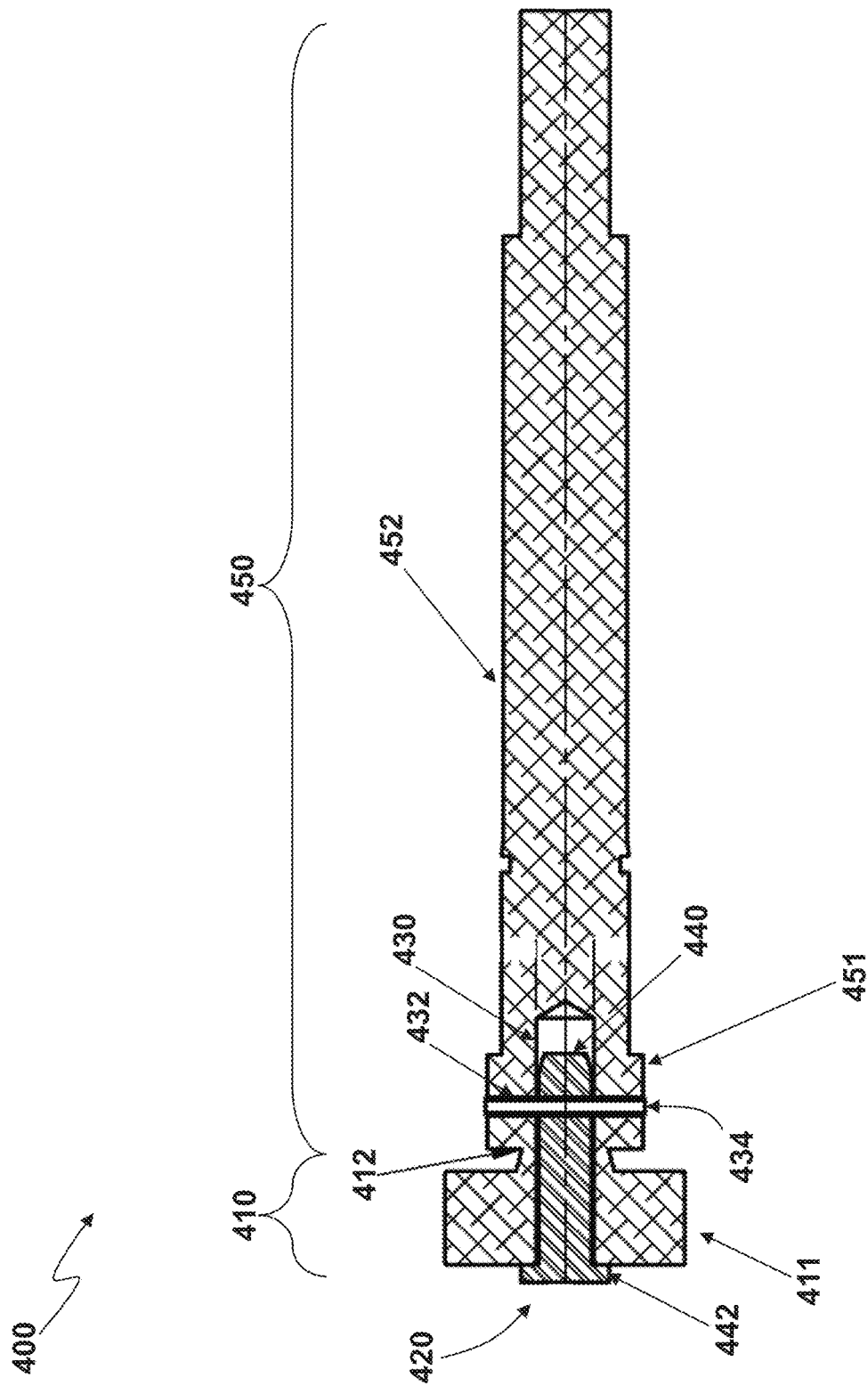
FIG. 9 is a longitudinal cross-sectional view of the embodiment shear bolt depicted in FIG. 8.
Figure 10:
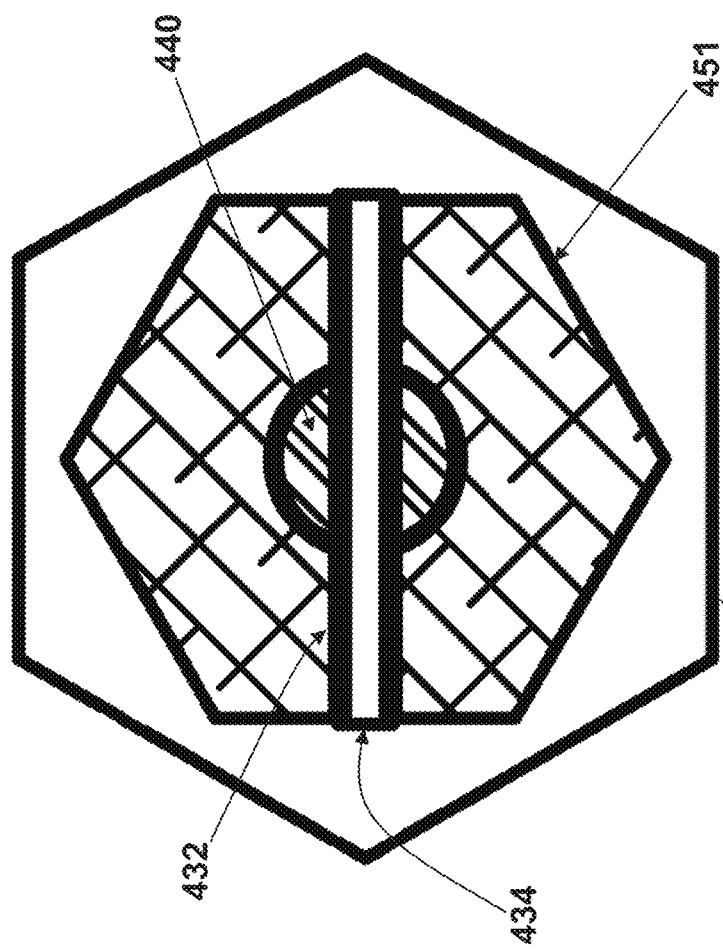
FIG. 10 is a radial cross-sectional view of the embodiment shear bolt depicted in FIG. 8.

FIGS. 8-10 depict another embodiment safety shear bolt 400. Similar to shear bolts 200 and 300 discussed above, shear bolt 400 comprises a torque head portion 410, which protrudes from a main bolt portion 450 by a predetermined distance. Main bolt portion 450 can have the appearance of a standard bolt suitable for the intended application and includes a head portion 451 with a threaded, or partially threaded, shaft portion 452. Torque head portion 410 includes an extended head portion 411, a stem portion 412 and a coupling mechanism 420. Stem portion 412 rigidly connects extended head portion 411 to head portion 451 and shears under a predetermined torque, as discussed in relation to the previous embodiments.

Coupling mechanism 420 comprises a fastening device in the form of a headed pin 440, which is disposed within a longitudinal opening 430 that extends through extended head portion 411, stem portion 412 and into main bolt portion 450. Head 442 of headed pin 440 abuts the top surface of extended head portion 411. A radial opening 432 extends through main bolt portion 450, such as through head portion 451, and through headed pin 440, intersecting longitudinal opening 430. A slotted spring pin 434 is disposed through radial opening 432 to mechanically engage with both main bolt portion 450 and headed pin 440. The slotted pin may be a standard spring pin, with a longitudinal slot providing a spring effect. Slotted spring pin 434 keeps headed pin 440 connected to main bolt portion 450, while head 442 of headed pin 440, which is sized greater than the diameter of longitudinal opening 430 through extended head portion 411, prevents extended head portion 411 from coming off of headed pin 440, thus releasably securing extended head portion 411 to main bolt portion 450. Extended head portion 411, however, cannot rotate freely with respect to head portion 451 of main bolt portion 450, such as around headed pin 440, until slotted pin 434 is sheared, and thus remains physically connected to main bolt portion 450. However, with an adequate pulling force or torque exerted upon extended head portion 411, slotted spring pin 434 will shear so that headed pin 440 can be released from longitudinal opening 430, thus physically detaching extended head portion 411 from main bolt portion 450, but only if stem portion 412 and slotted spring pin 434 have already sheared.

Figure 11:
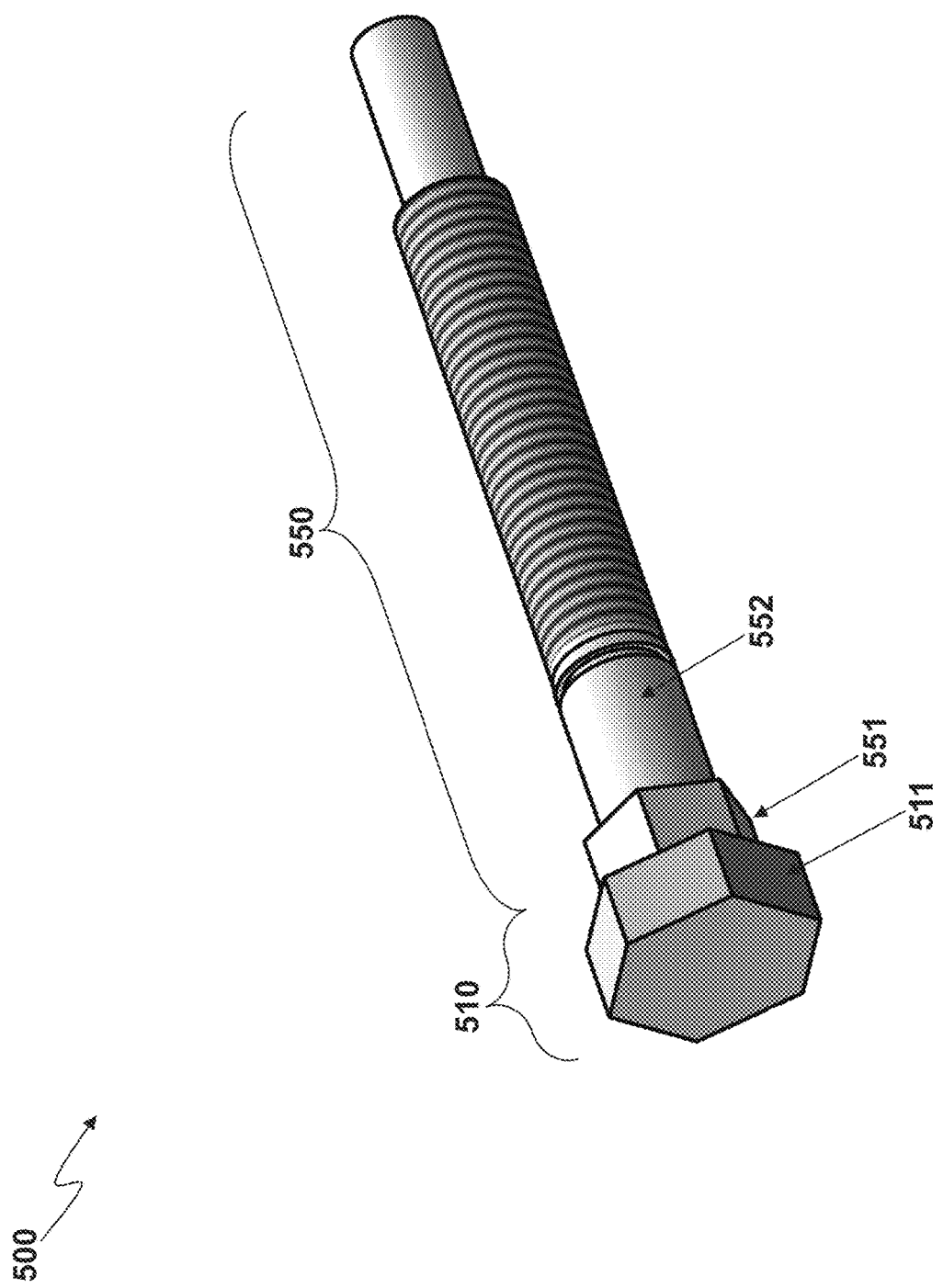
FIG. 11 is a perspective view of another embodiment shear bolt.
Figure 12:
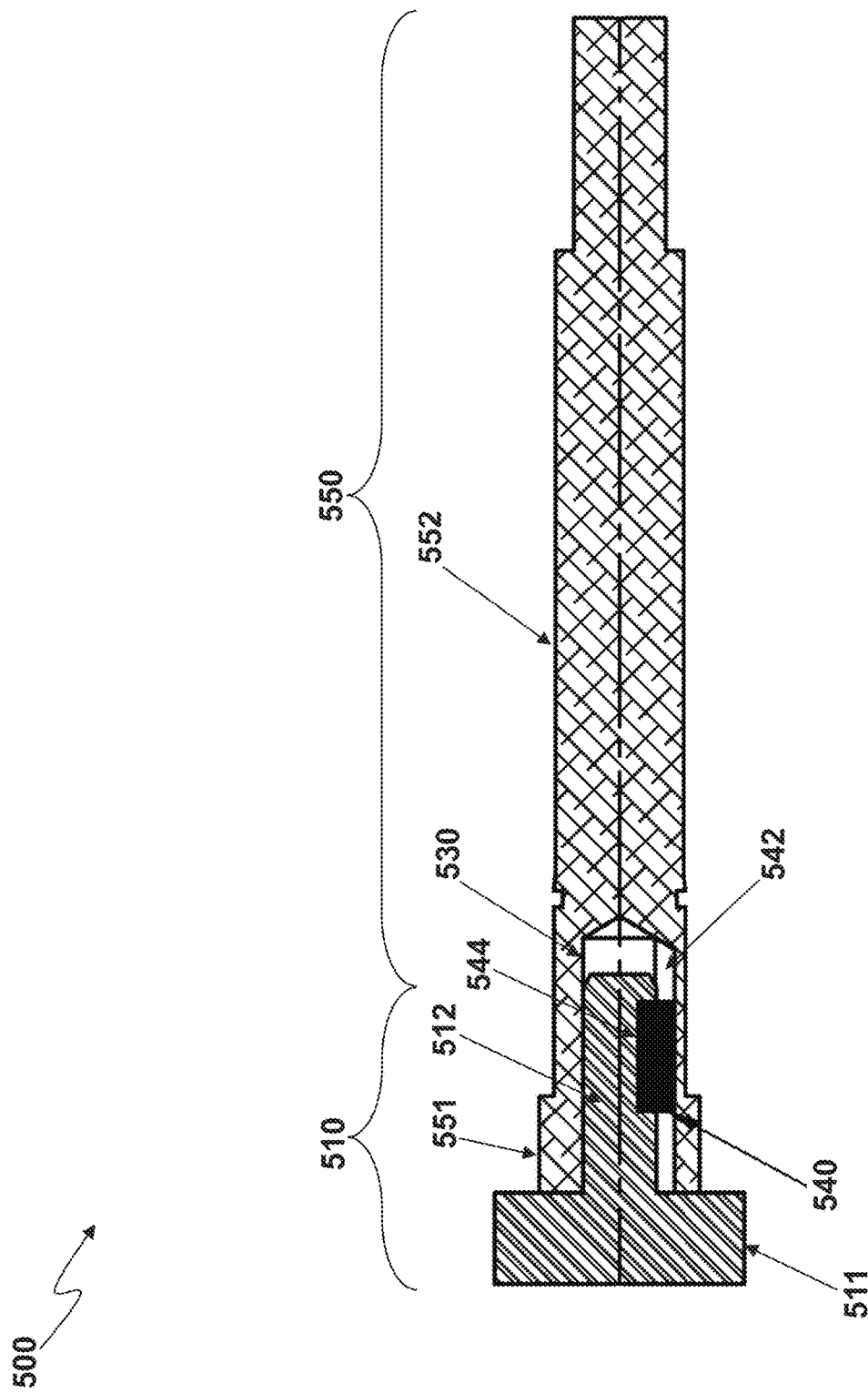
FIG. 12 is a longitudinal cross-sectional view of the embodiment shear bolt depicted in FIG. 11.
Figure 13:
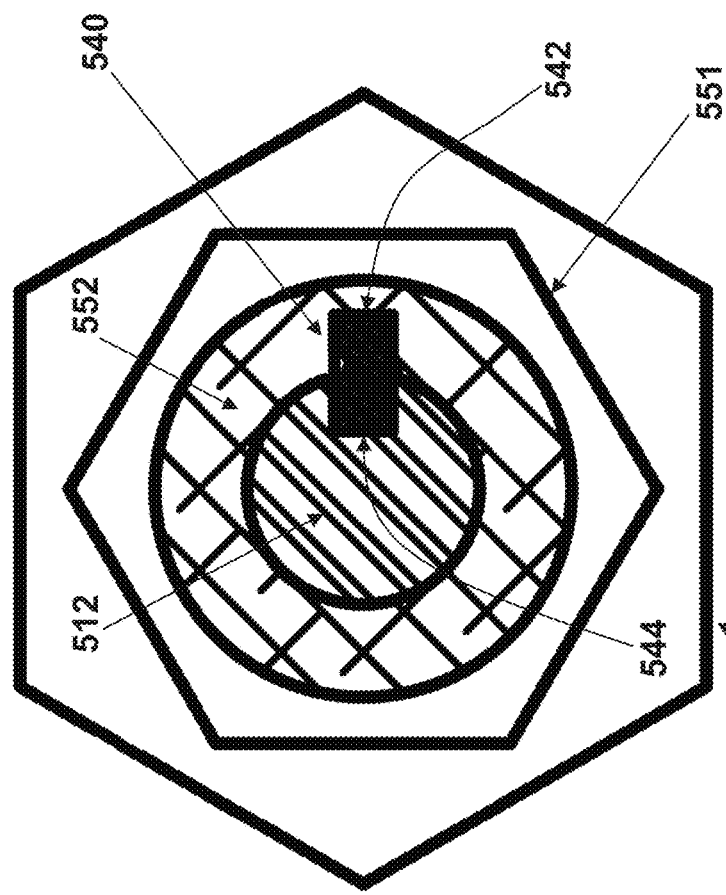
FIG. 13 is a radial cross-sectional view of the embodiment shear bolt depicted in FIG. 11.

FIGS. 11-13 depict another embodiment safety shear bolt 500. Unlike shear bolts 200, 300 and 400 discussed above that utilize a stem 212, 312, 412 to rigidly connect the torque head portion to the main bolt portion, the shear bolt 500 instead utilizes a mechanical key 540 as a shear device. Shear bolt 500 comprises a torque head portion 510, which protrudes from a main bolt portion 550 by a predetermined distance. Main bolt portion 550 can have the appearance of a standard bolt suitable for the intended application and includes a head portion 551 with a threaded, or partially threaded, shaft portion 552. Torque head portion 510 includes an extended head portion 511 rigidly connected to a stem portion 512. Mechanical key 540 provides a coupling mechanism 540 that rigidly connects torque head portion 510 to main bolt portion 550 and shears or breaks under a predetermined torque.

Stem portion 512 is disposed within a longitudinal opening 530 that extends into main bolt portion 550 from head portion 551. A surface of longitudinal opening 530 includes a first slot 542, and an end of mechanical key 540 is disposed within first slot 542. Similarly, an external surface of stem portion 512 includes a second slot 544, and another end of mechanical key 540 is disposed in second slot 544. Hence, mechanical key 540 extends from first slot 542 to second slot 544, and thus mechanically and rigidly couples torque head portion 510 to main bolt portion 550. Torque of a sufficient, predetermined value applied to extended head portion 511 causes mechanical key 540 to break or shear within longitudinal opening 530, so that stem portion 512 can thus rotate freely within longitudinal opening 530, thereby rotationally detaching extended head portion 511 from main bolt portion 550. However, frictional engagement of mechanical key 540 can keep stem portion 512 releasably connected to main bolt portion 450, and thus longitudinally restrained. With an adequate pulling force exerted upon extended head portion 511, stem portion 512 can be pulled from longitudinal opening 530, thus physically detaching extended head portion 511 and stem portion 512 from main bolt portion 550, but only if mechanical key 540 has already sheared.

Figure 14:
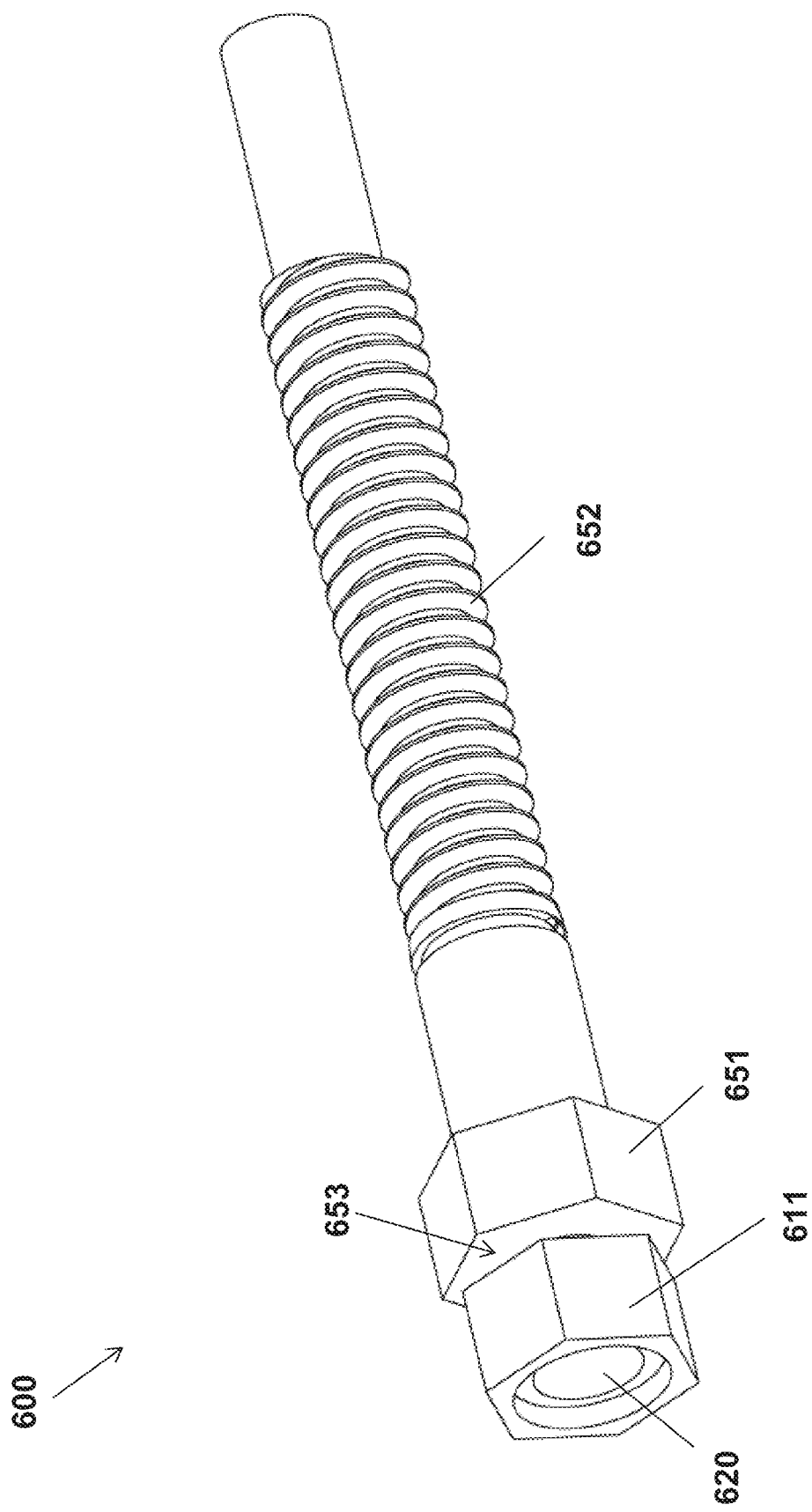
FIG. 14 is a perspective view of another embodiment shear bolt.
Figure 15:
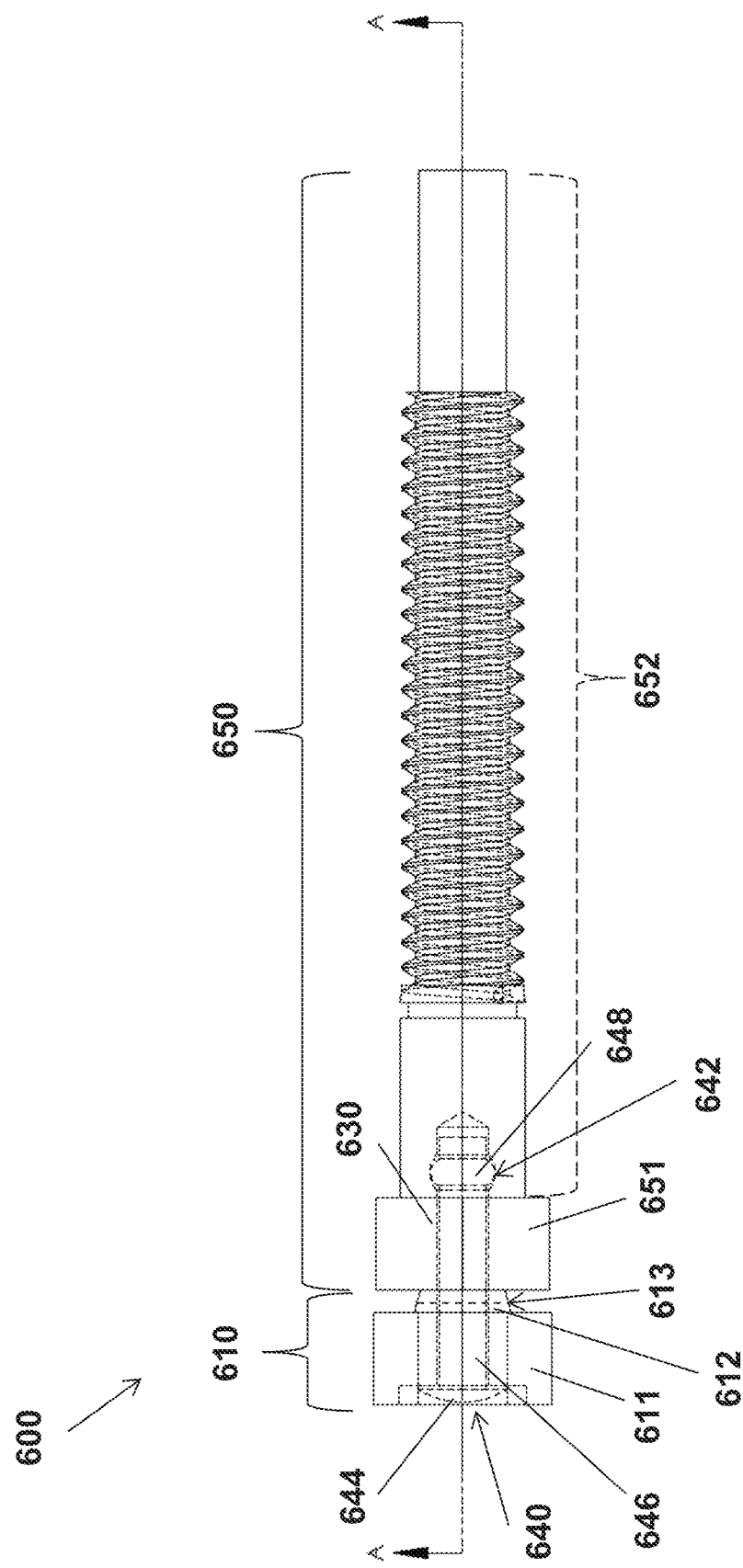
FIG. 15 is a side view of the embodiment shear bolt depicted in FIG. 14.
Figure 16:
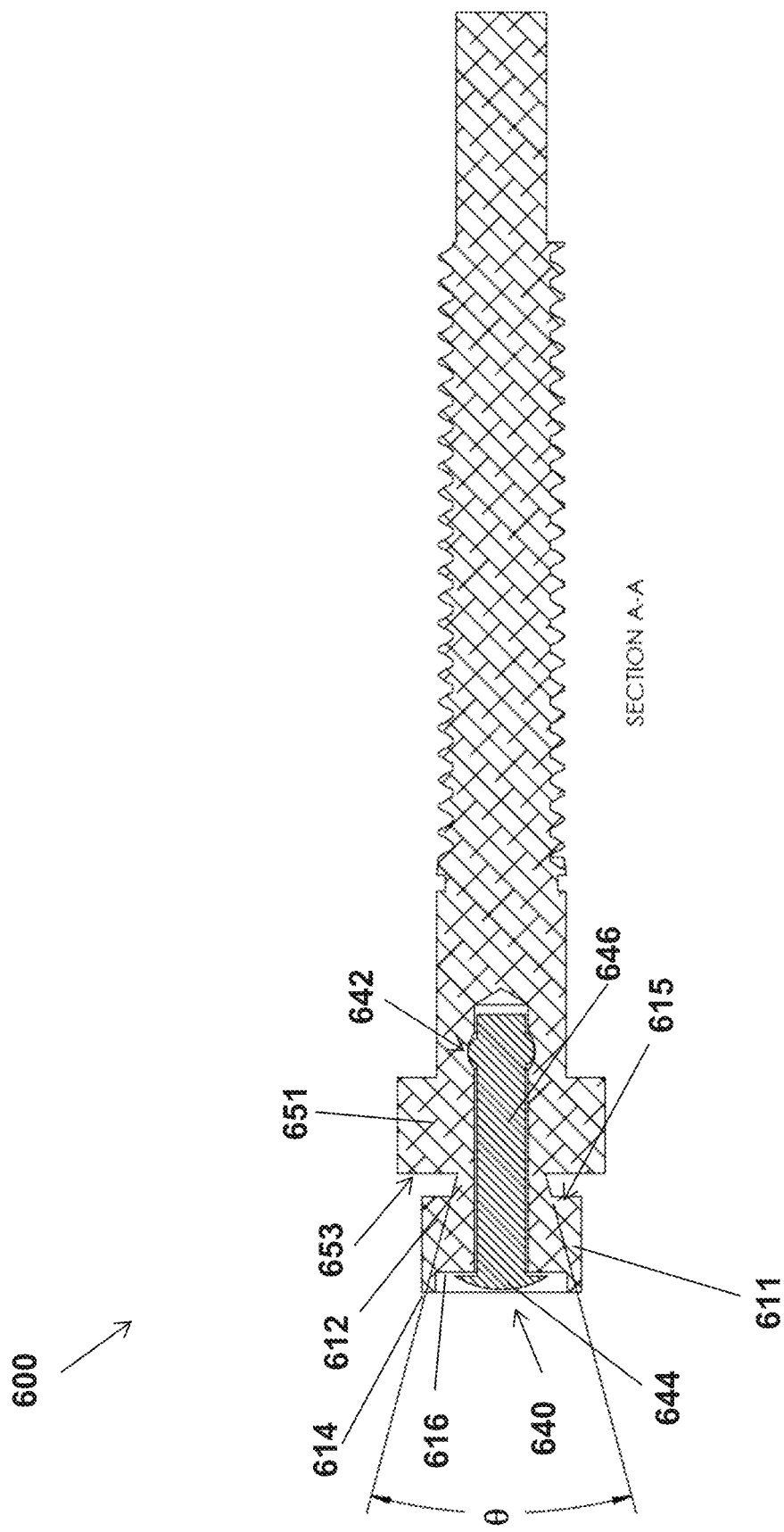
FIG. 16 is a cross-sectional view along line A-A shown in FIG. 15.

FIGS. 14-16 depict another embodiment safety shear bolt 600. The safety shear bolt 600 comprises a torque head portion 610, which protrudes from a main bolt portion 650 by a predetermined distance. Main bolt portion 650 can have the appearance (i.e., length, diameter, threading, head size, etc.) of a standard bolt suitable for the intended application and includes a head portion 651 with a threaded, or partially threaded, shaft portion 652. The head portion 651 and shaft portion 652 are preferably designed to have dimensions similar, or functionally identical, to those required of the standard bolt for the same application. Safety shear bolt 600 is preferably formed as a single, integrated piece. In alternative embodiments, however, safety shear bolt 600 is formed in separate pieces such that torque head portion 610 and main bolt portion 650, as respective separate pieces, are coupled together to form the integrated safety shear bolt 600.

Torque head portion 610 includes an extended head portion 611, a stem portion 612 and a coupling mechanism 620. Extended head portion 611 and stem portion 612 are formed as a single, integrated piece. In other embodiments, extended head portion 611 and stem portion 612 are formed as separate pieces that are joined together. Coupling mechanism 620 is a separate piece that is used to connect extended head portion 611 to main bolt portion 650 after stem portion 612 has sheared along a shear line 613.

Stem portion 612 extends from top surface 653 of head portion 651 of main bolt portion 650 to the underside surface 615 of extended head portion 611 and rigidly connects main bolt portion 650 to extended head portion 611. Although a single stem portion 612 is shown, in other embodiments multiple stem portions may be employed. Stem portion 612 is designed such that extended head portion 611 breaks or shears off, along shear line 613, from main bolt portion 650 when a pre-determined amount of torque is applied to extended head portion 611, thus rotationally detaching extended head portion 611 from main bolt portion 650—i.e., extended head portion 611 is then free to rotate relative to main bolt portion 650. Shear location 613 of stem portion 612 may be at any desired location, such that stem portion 612 may remain fully attached to extended head portion 611, to main bolt portion 650, or have portions attached to either or both, as a matter of application-specific design choice. Stem portion 612 may have any suitable shape, materials or both to achieve the desired shearing along shear line 613 when the pre-determined amount of torque is reached. For example, stem portion 612 may be made from the same metal as main bolt portion 650 and conically shaped, with an opening angle θ of approximately 30°. In the embodiment safety shear bolt 600, stem portion 612 has a thinner width than the width of shaft portion 652 of main bolt portion 650. In other embodiments, stem portion 612 is made from a metal or material that is different from that used to make main bolt portion 650.

Figure 20:
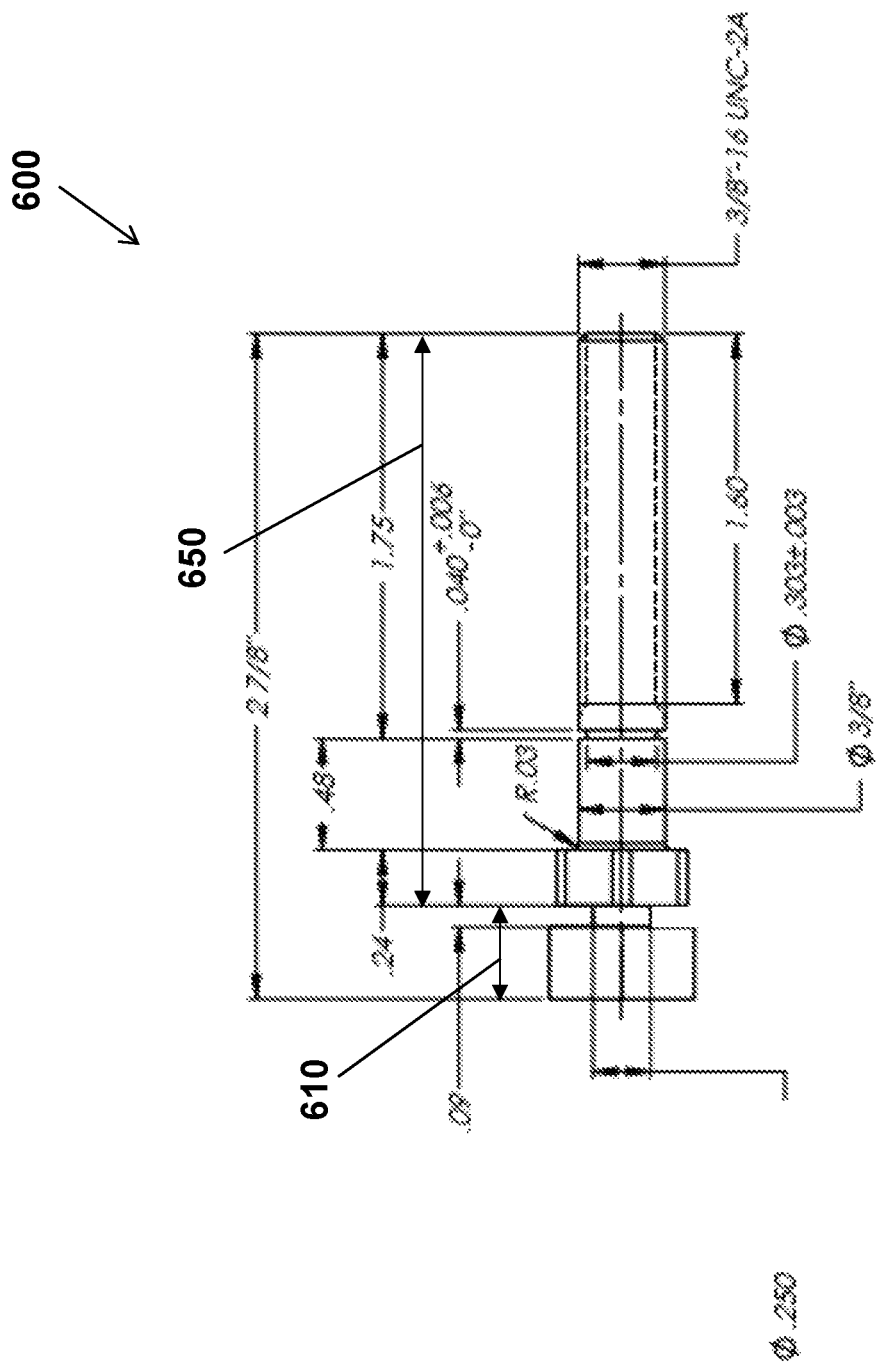
FIG. 20 is side view of an embodiment shear bolt with a flange, with dimensions indicated in inches.

Extended head portion 611 comprises a hexagonal shape, making it suitable for tightening or loosening using conventional tools (e.g., a socket wrench). In certain preferred embodiments, the longitudinal width (defined herein as the distance between flats) of extended head portion 611 is smaller than the corresponding width of head portion 651. Thus, top surface 653 of head portion 651 of main bolt portion 650 can function as a stop for the socket wrench, so that the extended head portion 611 can be easily and selectively removed without engaging head portion 651. In alternative embodiments, the longitudinal width of extended head portion 611 can be greater than or equal to that of head portion 651. In some embodiments (e.g., when the longitudinal width of extended head portion 611 is greater than or equal to that of head portion 651), as shown in FIG. 20, a dedicated stop comprising a ledge/flange or barrier having a longitudinal width greater than that of extended head portion 611 and head portion 651 can be provided on stem portion 612 (integrally formed with stem portion 612 or fixed thereto, e.g., by welding, glue, etc., either above or below shear line 613) to stop the socket wrench from engaging head portion 651. Similarly, the radial height of extended head portion 611 can be greater than, equal to, or smaller than the corresponding height of head portion 251. Extended head portion 611 may also have shapes other than hexagonal, such as square or the like.

Coupling mechanism 620 is any suitable device, configuration or both that can releasably connect extended head portion 611 to main bolt portion 650 after shearing of stem portion 612, thereby preventing inadvertent dropping of extended head portion 611. Hence, coupling mechanism 620 preferably allows rotational detachment of extended head portion 611 from main bolt portion 650, i.e., allowing extended head portion 611 to rotate with respect to main bolt portion 650, while ensuring a continued physical connection of extended head portion 611 to main bolt portion 650, such as by preventing free longitudinal movement of extended head portion 611 with respect to main bolt portion 650. That is, coupling mechanism 620 preferably rotationally connects extended head portion 611 to main bolt portion 650 in a longitudinally releasable manner. In the embodiment safety shear bolt 600, coupling mechanism 620 comprises a fastening device in the form of a blind rivet 640, which is disposed within an opening 630 that extends through extended head portion 611, stem portion 612 and into main bolt portion 650, such that a back side 642 of blind rivet 640 is disposed within and frictionally engages with main bolt portion 650. Frictional engagement of back side 642 keeps blind rivet 640 connected to main bolt portion 650, while head 644 of blind rivet 640, which is sized greater than the diameter of opening 630 through extended head portion 611, prevents extended head portion 611 from coming off of blind rivet 640, thus releasably securing extended head portion 611 to main bolt portion 650. Extended head portion 611 can still rotate freely with respect to head portion 651 of main bolt portion 650, such as around blind rivet 640, but remains physically connected to main bolt portion 650. However, with an adequate pulling force exerted upon extended head portion 611, blind rivet 640 can be released from opening 630 in main bolt portion 650, thus physically detaching extended head portion 611 from main bolt portion 650, but only if stem portion 612 has already sheared.

Figures 17A, 17B:
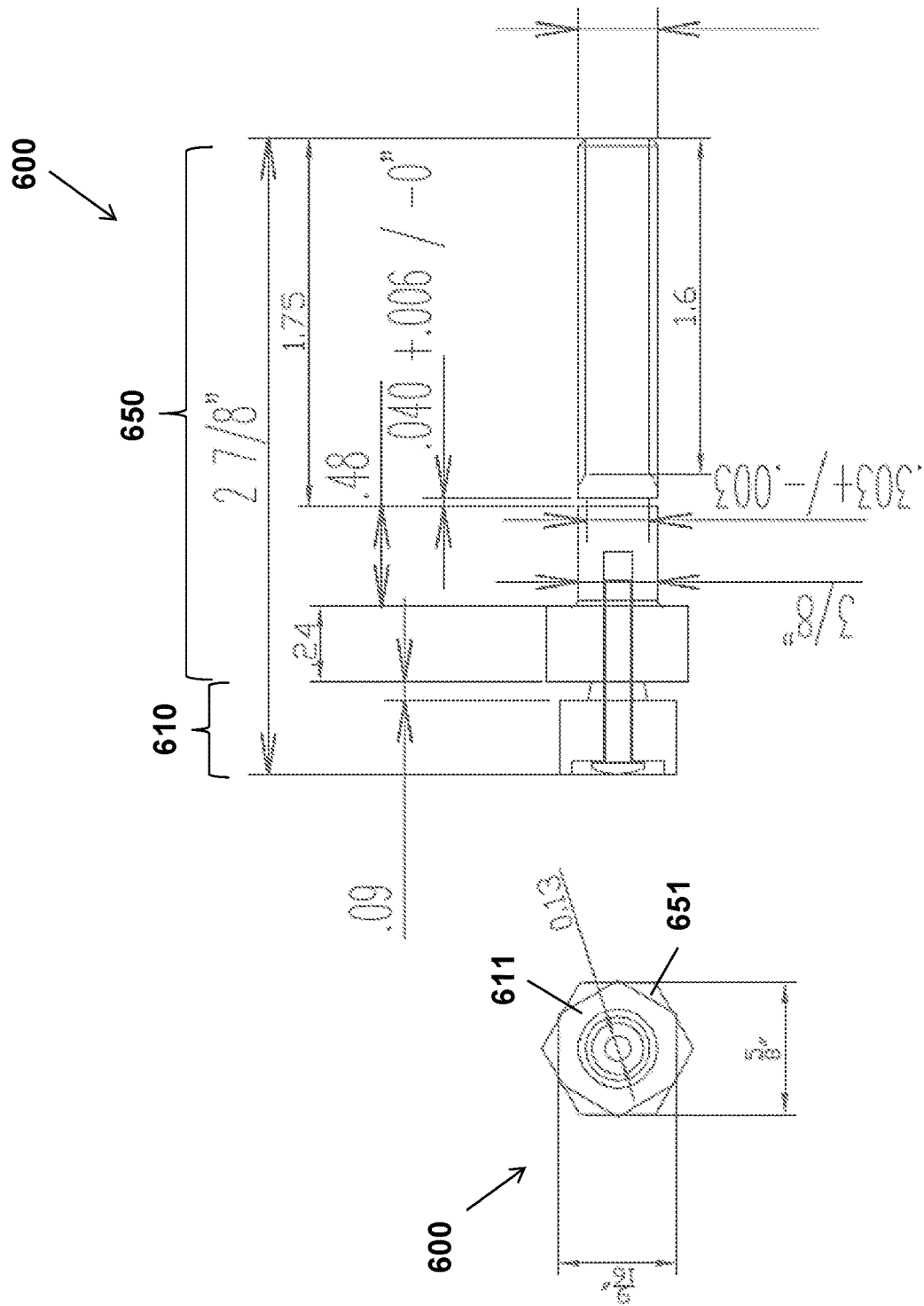
FIG. 17A is a top view and FIG. 17B is side view of a shear bolt with blind rivet in one exemplary size, with dimensions indicated in inches.

FIGS. 17A and 17B show top and side views of one size of safety shear bolt 600, according to some embodiments. FIGS. 18A and 18B show top and side views of another size of safety shear bolt 600, according to some embodiments. As indicated in FIGS. 17A and 18A, in some embodiments, the extended head portion may have a longitudinal width of 9/16" and the head portion of the main bolt portion may have a corresponding width of 5/8". The shaft portion of the main bolt portion may have a standard width, such as 3/8", and/or length, such as 2⅞". The dimensions shown in FIGS. 17A, 17B, 18A, and 18B are merely exemplary. The dimensions of safety shear bolt 600 can be varied, for example, for use in connecting cables of varying sizes.

Figure 19:
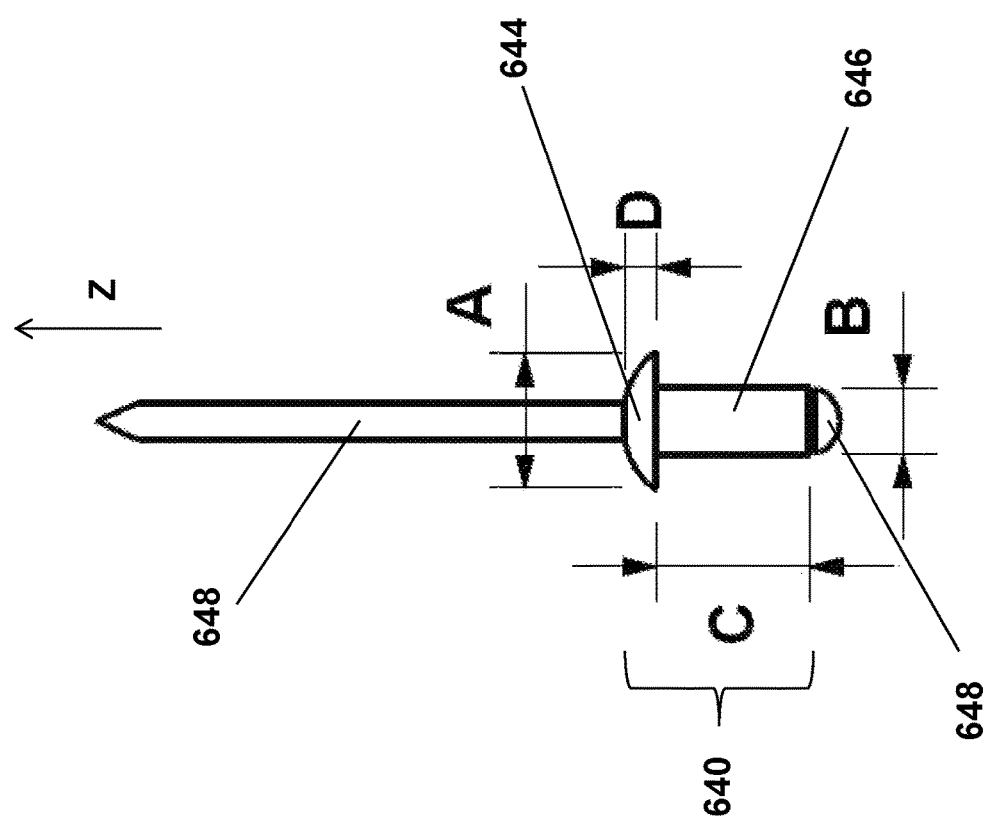
FIG. 19 is a side view of an exemplary blind rivet before installation.

An exemplary blind rivet 640 is shown in FIG. 19, before installation. The blind rivet before installation comprises the rivet (head 644 and stem 646) and a mandrel 648 extending through the rivet. When the blind rivet is installed, the rivet is inserted into the hole/opening stem first, and a riveter is used to pull the mandrel back (direction Z, in the orientation of FIG. 19) while holding the rivet in place. As the mandrel is pulled back it deforms the rivet, pushing the sides outward until the mandrel snaps. As shown, for example, in FIG. 15, when blind rivet 640 is installed in safety shear bolt 600, this expanded portion (which includes an end portion of mandrel 648 that remains in the rivet after installation), forms the back side 642 of rivet 640 holding extended head portion 611 and main bolt portion 650 together.

It will be appreciated that various types and sizes of blind rivets can be used for the fastening device in safety shear bolt 600. For example, the rivet can be standard (open-end), sealed (closed-end), multi-grip, interlock (high-strength), high-retention, load spreading, etc. The head of the rivet can be dome, flat, oversize, etc. Materials for the rivet and mandrel can be the same or different, and can include, but are not limited to, aluminum, steel, and stainless steel. In the exemplary rivet shown in FIG. 19, both rivet and mandrel are aluminum, and the dimensions are as follows: A=0.256", B=0.122", C=0.630", D=0.045". In other embodiments, rivets of different dimensions may be used.

As shown, for example, in FIG. 16, in some embodiments, top surface 614 of extended head portion 611 may include a recessed portion 616 on which head 644 of blind rivet 640 rests. Recessed portion 616 may be positioned at any depth relative to top surface 614. In some embodiments, recessed portion 616 may be positioned such that head 644 of blind rivet 640 does not extend beyond top surface 614 of extended head portion 611. Blind rivet 640 advantageously has a low profile relative to other fastening devices and is a cost-effective way of providing a captive sheared torque head.

Those skilled in the art will recognize that the present invention has many applications, may be implemented in various manners and, as such is not to be limited by the foregoing embodiments and examples. Any number of the features of the different embodiments described herein may be combined into a single embodiment, the locations of particular elements can be altered and alternate embodiments having fewer than or more than all of the features herein described are possible. Functionality may also be, in whole or in part, distributed among multiple components, in manners now known or to become known.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention. While there has been shown and described fundamental features of the invention as applied to being exemplary embodiments thereof, it will be understood that omissions and substitutions and changes in the form and details of the disclosed invention may be made by those skilled in the art without departing from the spirit of the invention. Moreover, the scope of the present invention covers conventionally known, future developed variations and modifications to the components described herein as would be understood by those skilled in the art.

What is claimed is:

1. A safety shear bolt comprising:
    a main bolt portion comprising:
        a first head portion; and
        a shaft portion;
    a torque head portion rigidly connected to the main bolt portion, the torque head portion comprising:
        a second head portion; and
        a stem portion extending from a top surface of the first head portion of the main bolt portion to an underside surface of the second head portion, the stem portion configured to shear along a shear line when a predetermined amount of torque is applied to the second head portion; and
    a coupling mechanism configured to connect the second head portion to the main bolt portion after shearing of the stem portion, thereby preventing inadvertent dropping of the second head portion, the coupling mechanism allowing the second head portion to rotate with respect to the main bolt portion while preventing free longitudinal movement of the second head portion with respect to the main bolt portion,
    wherein the coupling mechanism comprises a fastening device comprising a blind rivet.

2. The safety shear bolt of claim 1, wherein the coupling mechanism comprises:
    an opening longitudinally disposed through the torque head portion and into at least a portion of the main bolt portion, and
    the blind rivet is disposed in the opening and engages with the main bolt portion.

3. The safety shear bolt of claim 1, wherein the second head portion has a width smaller than that of the first head portion.

4. A safety shear bolt comprising:
    a main bolt portion comprising:
        a first head portion; and
        a shaft portion;
    a torque head portion rigidly connected to the main bolt portion, the torque head portion comprising:
        a second head portion; and
        a stem portion extending from a top surface of the first head portion of the main bolt portion to an underside surface of the second head portion, the stem portion configured to shear along a shear line when a predetermined amount of torque is applied to the second head portion; and
    a blind rivet,
    wherein an opening is longitudinally disposed through the torque head portion and into at least a portion of the main bolt portion, and
    the blind rivet is disposed in the opening and engages with the main bolt portion.

* * * * *